May 28, 1935.  G. M. DEMING  2,002,884
GAS REGULATOR
Filed July 5, 1933
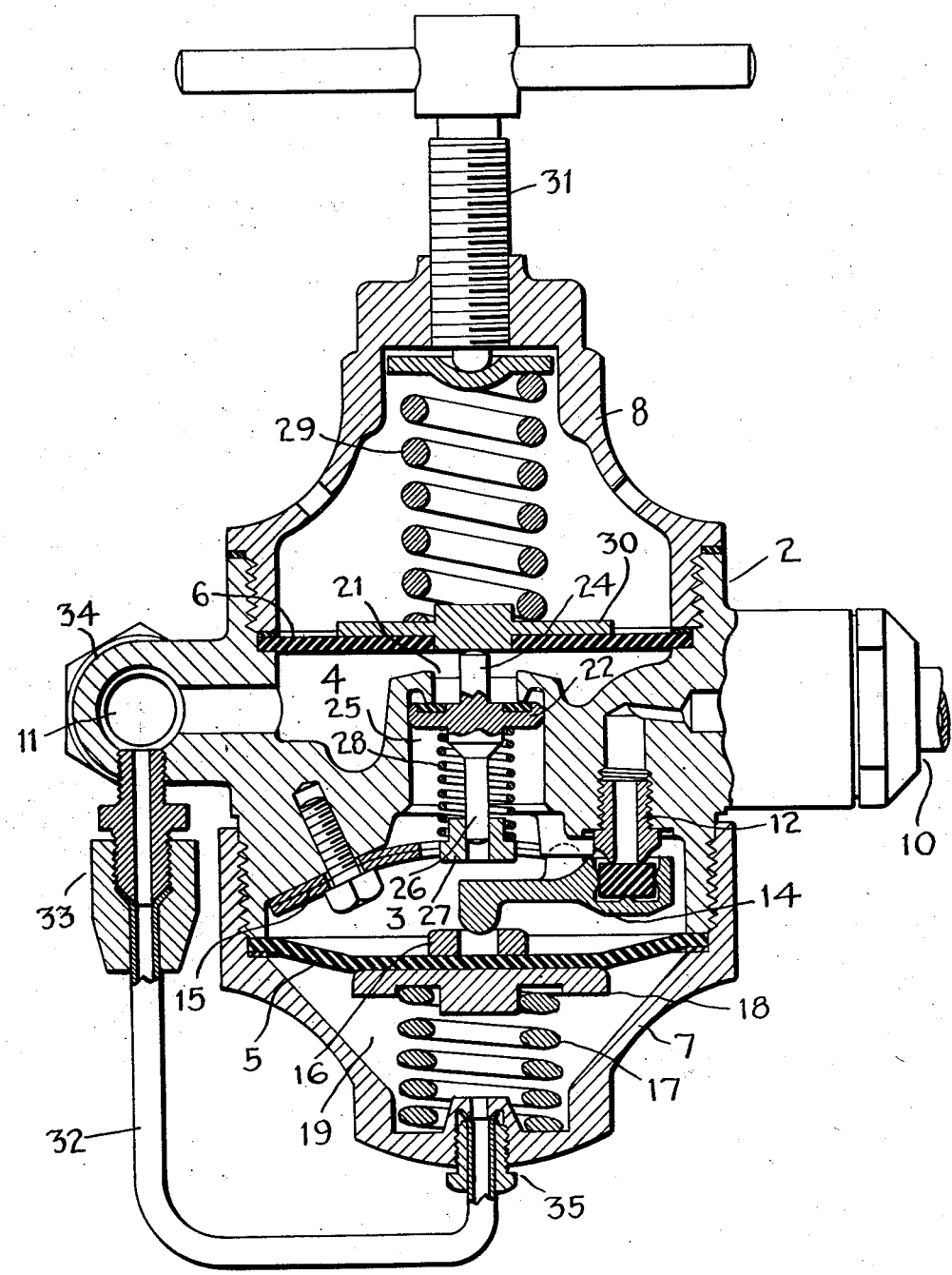
INVENTOR
George M. Deming
BY
J. F. ......  ATTORNEY Patented May 28, 1935

2,002,884

UNITED STATES PATENT OFFICE 2,002,884

GAS REGULATOR

George M. Deming, East Orange, N. J., assignor to Air Reduction Company, Incorporated, New York, N. Y., a corporation of New York Application July 5, 1933, Serial No. 679,049

2 Claims. (Cl. 50—26)

This invention relates to gas pressure regulators, that is to say, automatic valves having control means responsive to the gas pressure at the reduced pressure side of the valve, whereby this pressure is held substantially uniform, at any adjustment that may be effected, notwithstanding that there be changing gas pressure at the high pressure side. The invention relates more especially to regulator apparatus in which the pressure is reduced in two or more stages, such apparatus comprising a plurality of regulator valves in series relation. In the preferred embodiment of the invention, the stages are embodied in a single unit of apparatus, this, however, not being a limitation upon the broader aspect of the invention.

Among the objects of the invention are the following: to provide a double reduction regulator, or combination of regulators, which is adapted to reduce gas pressure from a declining source pressure starting above 1000 lbs. per square inch to adjustable delivery pressures of the order of several atmospheres at least, and which will keep the delivery pressures as uniform as possible throughout a wide range of flows, including very heavy flows, for which the apparatus may be adjusted, or which will keep any flow as uniform as possible as long as the demand remains constant; to make the end point of regulation as low as possible (end point being the point in the fall of supply pressure at which regulation ceases to be effective); to facilitate the assembling of the regulator; and to promote compactness.

In pressure regulators, the stiffness of control springs is a factor adverse to the attainment of perfect regulation, and affects, among other things, the end point. The stronger the spring is required to be, the greater is this factor of spring-stiffness. The present invention makes it possible to use weaker control springs in place of stronger ones, and thereby makes possible the advantages which have been referred to, as well as others which will be indicated or which will be apparent to those skilled in the art.

It will be convenient to state the nature of the invention in terms of a two-stage reduction regulator. Briefly, a means is provided for communicating pressure of the gas at or beyond the low-pressure side of the second stage to the back of the diaphragm of the first stage, against which diaphragm a control spring also acts. In this way, the intermediate gas pressure of the regulator, which is the reduced pressure of the first stage, is maintained at a certain fixed value above the low pressure, which is the reduced pressure of the second stage. For simplicity, these reduced pressures may be referred to as the first-stage pressure and the second stage pressure, respectively. In the absence of the balancing gas pressure on said diaphragm, the first-stage pressure would be maintained substantially constant, whereas the regulator disclosed herein maintains a substantially constant differential between the first and second stage pressures, regardless of the value of the second stage pressure. This makes for better regulation and lower end points. Because the first-stage control spring is called upon to exert only part of the pressure acting to unseat the first stage valve, it is much weaker and has much less stiffness than the spring that would otherwise be required.

The accompanying drawing shows what may be termed a longitudinal section through a regulator embodying the invention, this drawing being merely illustrative since the invention may be embodied in numerous forms.

This illustrative regulator has a substantially cylindrical body 2 hollowed at both sides or ends to provide chambers 3 and 4, the outer sides of which are closed by diaphragms 5 and 6, which are clamped at their margins between seats on the body and a cap 7 and a bonnet 8, respectively, these being screwed onto the body. In double reduction regulators, a chamber such as the chamber 3 is sometimes referred to as an inter-stage chamber. It is the reduced pressure chamber of the first stage of the regulator, and the pressure which exists in this chamber may be referred to as the intermediate pressure of the regulator, or simply as the first stage pressure. The chamber 4 is the reduced pressure chamber of the second stage. The pressure in this chamber may be referred to as the low pressure or delivery pressure, or simply as the second stage pressure. The diaphragms form flexible walls of these chambers.

The body has an inlet 10, for connection with a manifold, a supply line, or with a gas cylinder. This is the high pressure side of the regulator. An outlet 11 delivers the gas, under the pressure to which it is finally reduced, and which is to be kept uniform, to the consumption system. A nozzle 12 communicating with the inlet represents an orifice through which the gas must pass from the inlet to the first stage chamber 3, under control of a valve member 14, which is preferably, though not necessarily, of the lever style. This is one of the forms used in direct-type regulators, direct type regulators being those in which the valve member closes against the pressure of the gas seeking to pass through the orifice. In direct type regulators it is customary to provide a compensating spring, which bears upon the valve member with enough pressure to close the valve against the pressure of the gas in the orifice. A compensating spring 15 of the kind disclosed in my Patent No. 1,839,837, dated January 5, 1932, may be employed.

The tail of the valve lever 14 bears against the inner side of the diaphragm 5, or against a part 16 applied against the diaphragm. A control spring 17 is confined under compression between the cap 7 and a plate 18 backing the diaphragm. This spring is much weaker than it would have to be if it supplied all the force tending to open or unseat this valve. When gas is passing through the regulator, a large part of the pressure acting to unseat the valve is gas pressure within the control chamber 19 formed by the cap 7 and the diaphragm 5. In ordinary regulators a cap, otherwise substantially like the cap 7, would be vented, but the cap of this regulator is imperforate and care is taken to make the chamber 19 pressure-tight. It will be understood by those familiar with pressure regulators that, when the pressure in the first stage chamber 3 tends to rise, this pressure moves the diaphragm slightly outward, in consequence of which the compensating spring 15 closes the valve, or brings the valve member closer to the nozzle, and that when this presure tends to fall, the spring and gas pressure back of the diphragm move the diaphragm slightly inward, thereby opening the valve or increasing the degree of opening.

Gas from the chamber 3 must gain entrance to the chamber 4 through an orifice 21 commanded by a second stage valve member 22. This part of the regulator is preferably, though not necessarily, of the inverse regulator type, in which the valve member closes in the direction of pressure of the gas. Thus, the valve member 22 is shown as being of the rectilinearly moving style seating against a lip at the inlet side of the orifice 21, and having a pin or projection 24 to coact within the inner side of the diaphragm 6. The valve member is guided at its periphery in a central cavity 25 of the body, which is a part of the chamber 3, and by a pin 26 sliding in a suitably supported guide 27. As is customary in this type of regulator valve, a so-called marginal spring 28 is provided, this spring acting with the gas pressure and tending to close the valve, which it does, completely or partially, whenever the gas pressure in the chamber 4 tends to rise above a predetermined value. When this pressure tends to fall below the definite value, the valve member is opened, or is opened somewhat more widely by the pressure of an adjusting spring 29, which bears against a plate 30 backing the diaphragm 6. This spring is housed within the bonnet 8, provided with vent holes as usual, and its pressure can be regulated by an adjusting screw 31, the adjustment thus effected determining the value, higher or lower, of the delivery gas pressure that will be maintained.

The gas pressure which acts against the back of the first stage diaphragm 5 over and above the pressure of the control spring 17, is derived from the chamber 4, or from the outlet 11, or for that matter from a point in the delivery pipe that is connected with this outlet. This may be expressed as the pressure at the low pressure side of the regulator, or the reduced pressure of the lower stage of the regulator. In the particular construction shown, one end of a small tube 32 is secured by a suitable fitting 33 to an opening in the outlet boss 34, while the other end of this tube is secured by a fitting 35 to an opening in the cap 7. Consequently, whatever gas pressure exists in the low pressure region of the regulator also exists in the control chamber 19.

The operation of the regulator may be explained in the following manner, it being assumed that the inlet 10 is connected with a manifold or other source where there is gas under high pressure. If the adjusting screw 31 is in the position at which the adjusting control spring 29 of the second stage is released as much as possible, the second stage valve member 22 will stay closed and gas will not flow through the regulator. Gas pressure will exist, however, in the first stage chamber 3, the amount of this pressure depending upon the tension of the first stage control spring 17. Simply for purpose of example, let it be assumed that the pressure in the chamber 3 is then on the order of 75 lbs. per sq. in. If the adjusting screw is now turned in, pressure is developed in the second stage chamber. Through the tube 32, this pressure is transmitted to the control chamber 19, where it exerts on the first stage diaphragm a force which is balanced by an increase of pressure in the first stage chamber 3. This results in the first stage gas pressure building up promptly in step with the delivery pressure, the first stage pressure being greater than the second stage pressure by a constant differential corresponding to the pressure of the spring 17. The adjusting spring of the second stage can be set by the screw 31 for any desired delivery pressure. If this pressure should be 150 lbs. per sq. in. existing in the chamber 4 and in the outlet 11, and if the differential should be 75 lbs. per sq. in. as assumed, the pressure in the first stage chamber 3 would be 225 lbs. per sq. in. The high pressure of the gas delivered to the inlet 10, which may be 1500 lbs. at the outset, will decline as gas is used, until eventually the end point of regulation is reached. Until the end point is reached, and as long as the adjustment of the spring 29 is not changed, the pressure in the chamber 3 will be maintained at 225 lbs. per sq. in. If, however, the screw 31 is turned to increase or decrease the delivery pressure, the first stage pressure in chamber 3 will be increased or decreased by a like amount, the differential of 75 lbs. per sq. in. remaining substantially constant. In known two-stage regulators or combinations of regulators in series, the first stage pressure would not be changed in this manner by a change in the second stage pressure, but would remain substantially constant.

With a constant differential between the first and second stage pressures, regulation is more uniform regardless of the flow or pressure, than would be the case if a constant first stage pressure were used.

By this method of maintaining a sufficient first stage pressure, the first stage control spring need be much less stiff and develop much less stress at the working length than would a spring capable, alone, of maintaining the lowest constant first stage pressure that would be allowable. Thus, for a kind of service in which a first stage control spring sufficient to maintain a pressure differential of about 75 lbs. per sq. in. would be used under this invention, a spring adequate to maintain a first stage pressure of about 250 lbs. would be required in one of the usual double stage regulators. Besides other advantages, the weaker spring makes the screwing of the back cap 7 onto the body easier, and there is less wear and tear on the parts and less possibility of derangement when that is done. A comparatively short spring suffices, and this makes the regulator shorter.

It will be evident that the invention is applicable to apparatus in which pressure may be reduced in more than two stages.

I claim:

1. A gas pressure regulator apparatus comprising means for reducing gas pressure from a declining source pressure starting above 1000 lbs. per square inch to adjustable delivery pressures of the order of several atmospheres at least, the said means including two regulator valve stages of the diaphragm type in series, an adjusting spring acting on the second-stage diaphragm, with means for adjusting the pressure of said spring, a back-cap forming with the first-stage diaphragm a tight gas pressure chamber at the outer side of said diaphragm, a control spring in said gas pressure chamber, and a control duct connecting said chamber with the reduced pressure side of the lower stage of the apparatus.

2. A multiple-stage gas pressure regulator, comprising a body having an inlet to receive gas under high pressure, an intermediate pressure chamber, a low pressure chamber, a first-stage orifice through which gas from the inlet must pass to the intermediate pressure chamber, a second-stage orifice through which gas from the intermediate pressure chamber must pass to the low pressure chamber, and an outlet from the low pressure chamber, first and second-stage valve members coacting with said orifices, means tending to seat said valve members, a first-stage diaphragm forming a wall of the intermediate pressure chamber and coacting with the first-stage valve member, a cap forming with said diaphragm a tight control chamber at the outer side of the diaphragm, a control spring acting on said diaphragm, a second-stage diaphragm forming a wall of the low pressure gas chamber and coacting with the second-stage valve member, an adjusting spring acting on the second-stage diaphragm, and a control tube connecting said tight control chamber with the low pressure side of the regulator.

GEORGE M. DEMING.